United States Patent Office 3,705,808
Patented Dec. 12, 1972

3,705,808
PHOTO-SENSITIVE MATERIAL HAVING UV IRRADIATED POLYSTYRENE SUPPORT
Tsuneo Kasugai, Nobuhiko Minagawa, and Hiroyuki Kurabayashi, Shizuoka, Japan, assignors to Fuji Photo Film Co., Ltd., Kanagawa, Japan
No Drawing. Filed Sept. 8, 1970, Ser. No. 70,556
Claims priority, application Japan, Sept. 8, 1969, 44/71,120
Int. Cl. G03c 1/80
U.S. Cl. 96—87 R          5 Claims

ABSTRACT OF THE DISCLOSURE

A process of preparing a polystyrene support surface for reception of a photographic emulsion layer, comprising applying a sub-coating solution to a surface of a polystyrene support to form a sub-coating layer thereon, said sub-coating solution comprising a solvent or plasticizer for the polystyrene and a resin adherent to the photographic emulsion, and irradiating the support surface with ultra-violet radiation.

BACKGROUND OF THE INVENTION

Field of the invention

This invention relates to a process of preparing a polystyrene support surface for reception of a photographic emulsion layer.

Description of the prior art

Polystyrene is generally known to be a desirable support for use in photo-sensitive materials due to its superior transparency, hardness and dimensional stability, despite variations in its moisture content. However, although polystyrene has these excellent characteristics, it is hydrophobic and rather inert, thereby making it difficult to securely coat a polystyrene surface with a hydrophilic photographic emulsion. This difficulty has hitherto mostly been ovecome when utilizing a polystyrene-surfaced material as a support in photo-sensitive material by applying to the surface a sub-coating composition which is a solution or dispersion of a resin which is adherent to a photographic emulsion (hereinafter referred to as a "sub-coating resin"), in a solvent such as will dissolve or swell the polystyrene surface of the support; one or more sub-coating layers are thus formed on the polystyrene surface to cause the photographic emulsion layer to adhere to the support.

However, in this sub-coating process, the use of a sub-coating solvent which is a strong solvent for polystyrene, such as toluene, ethylene dichloride, ethyl acetate or acetone, leads to numerous fine cracks being formed on the polystyrene surface. This phenomenon, known as "solvent cracking," considerably impairs the transparency and the mechanical strength of the support, and the smoothness of the support surface. On the other hand, the use of a solvent which is only a weak solvent for polystyrene or of a mixed solvent containing only a small proportion of a strong solvent is insufficient to cause the sub-coating layer to adhere to the polystyrene support surface. Thus, the number of practicable sub-coating solvents is strictly limited.

An object of the present invention is to improve the adhesive strength between a polystyrene surface and a sub-coating thereon.

SUMMARY OF THE INVENTION

According to the present invention, there is provided a process of preparing a polystyrene support surface for reception of a photographic emulsion layer, comprising applying a sub-coating solution to the support surface to form a sub-coating layer thereon, said sub-coating solution comprising a solvent or swelling agent for the polystyrene and 15 to 60 g./liter of a resin adherent to the photographic emulsion, and irradiating the support surface with ultraviolet radiation. The support surface may be irradiated before, during and/or after the application of the sub-coating solution.

DETAILED DESCRIPTION OF THE PREFERRED EMBODIMENTS

As the support, there may, for example, be used a single polystyrene film or a polystyrene film laminated to paper or to a film of another plastic material. The polystyrene may be pure polystyrene, or may be polystyrene modified for the purpose of improving its impact strength, for example, a copolymer of styrene and butadiene; in addition, polystyrenes having incorporated therein a filler or foamed polystyrene may also be employed. The polystyrene selected is formed into a support in a conventional manner.

The sub-coating resins which may be used in the present invention are those to which the photographic emulsion will adhere and include gelatin, casein and synthetic polymers containing groups of at least one of the following formulae:

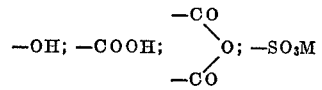

wherein M is a hydrogen atom or an alkali metal such as sodium or potassium. The synthetic polymers may be used singly or two or more together may be used.

Examples of such synthetic polymers are cellulose acetate maleate; a vinyl-maleic anhydride copolymer; an acrylamide-methacrylic acid copolymer; and a mixture of polyvinyl pyrrolidone and polyacrylic acid.

As the solvent or swelling agent, there may be used, for example, water, alcohols, phenols, carboxylic acid esters, chloroparaffins, and aromatic hydrocarbons; typical choices are methanol, ethanol, isopropanol, butanol, acetone, methyl ethyl ketone, phenol, o-chlorophenol, p-chlorophenol, methyl acetate, butyl acetate, methylene dichloride, chloroform, ethylene dichloride, benzene, toluene and xylene. These may generally be used singly or as mixtures thereof.

The preparation of the sub-coating solution using the aforesaid components may be performed in a conventional manner, and the term "solution" is intended also to cover dispersions and the like, The thickness of the sub-coating layer is not especially restricted but is normally from $0.5\mu$ to $5\mu$ depending upon the particular application.

The irradiation with ultra-violet radiation may be successfully carried out by any generally known method and is not subject to any particular restriction. Generally, however, the irradiation is carried out for 10 to 60 seconds with a power source of at least 10 w./cm.$^2$.

Irradiation with ultra-violet radiation according to the present invention enables the sub-coating solvent to be chosen more widely than in known sub-coating processes due to the remarkable improvement in the adhesive property of the polystyrene support surface.

As a result, the present invention makes it possible to achieve a sub-coating having extremely strong adhesion to the polystyrene support surface without causing it to crack.

Some specific embodiments of the present invention will now be described, by way of example.

In the following examples, the adhesion between the emulsion layer and the support was examined as follows:

(1) Examination of adhesion in the dry state:

Two mutually-prependicular intersecting scratches each about 4 cm. in length were made on the emulsion surface and a pressure-sensitive adhesion tape adhered thereto. The tape was then pulled off rapidly.

In this test, the term "good adhesion" means that over 70% of the emulsion covered by the tape remained after the tape had been pulled off.

(2) Examination of adhesion in processing solution:

At each stage of processing, a scratch was made on the emulsion surface with a steel pen, and the emulsion surface was subsequently rubbed with the finger-tip at right-angles to the scratch; the adhesion was regarded as good unless the emulsion beyond the scratch was released.

EXAMPLE 1

Biaxially-stretched polystyrene film having a thickness of $130\mu$ was irradiated with U.V. radiation on the surface to be coated with the emulsion. The irradiation was performed in air at 80° C., with a 1 kw. cylindrical mercury-quartz U.V. lamp, fixed at a distance of 20 cm. from the surface, for a period of 20 seconds. Thereafter, a sub-coating solution having the following composition was applied to the surface and dried for 3 minutes at 80° C.

| | |
|---|---|
| Gelatin | g-- 15 |
| Water | cc-- 30 |
| Methanol | cc-- 600 |
| Tetrachloroethane | cc-- 200 |
| Glacial acetic acid | cc-- 10 |
| Formalin | cc-- 0.5 |

The support surface for a photo-sensitive layer thus produced was not cracked by the solvent; and a photo-sensitive material, produced by applying a silver halide emulsion over the sub-coating layer on the support, exhibited good adhesive strength between the emulsion layer and the support.

On the other hand, a photo-sensitive material prepared by coating a similar support with a sub-coating solution having the foregoing composition but omitting the irradiation step, lost the whole emulsion layer during processing.

EXAMPLE 2

A sub-coating solution of the following composition was applied to the surface of a polystyrene film having a thickness of $130\mu$ and containing 7.5% by weight of titanium oxide. Thereafter, the sub-coated polystyrene film was dried for 5 minutes at 80° C., and irradiated with U.V. radiation as in Example 1.

| | |
|---|---|
| Acrylamide-methacrylic acid copolymer (2:1) | g-- 20 |
| Methanol | cc-- 450 |
| Isopropanol | cc-- 20 |
| Phenol | g-- 45 |
| Chromic acetate | g-- 1.5 |

A photo-sensitive material, produced by applying a gelatin silver halide emulsion over the sub-coating layer on said film, exhibited good adhesive strength between the emulsion layer and the support.

EXAMPLE 3

A polystyrene-coated paper, produced by laminating polystyrene film, $25\mu$ thick, to both surfaces of a photographic paper having a weight of 150 g./m.$^2$, was irradiated on the surface to be coated with the emulsion for 10 seconds under the same conditions as in Example 1, and then a sub-coating solution of the following composition was applied to the irradiated surface and dried for 5 minutes at 80° C.

| | |
|---|---|
| Vinyl acetate-maleic anhydride copolymer (1:1) | g-- 13 |
| Methanol | g-- 450 |
| Cyclohexanone | cc-- 80 |
| Phenol | g-- 40 |
| Chromic acetate | g-- 1.4 |

The sub-coated support so obtained did not suffer from solvent cracking and a photo-sensitive material, produced by applying a gelatin-silver halide emulsion to said sub-coating, exhibited good adhesion during the processing thereof and in the dry state.

On the other hand, a photo-sensitive material prepared by coating a similar support with a sub-coating solution having the foregoing composition, but omitting the irradiation step, exhibited inferior adhesion of the emulsion layer to the support during processing thereof; in an adhesion test performed on the photo-sensitive material in the dry state after processing, the whole emulsion layer was released.

EXAMPLE 4

A polystyrene film having a thickness of $100\mu$ and an improved impact strength, was irradiated for 30 seconds on the surface to be coated with a photosensitive emulsion under the same conditions as in Example 1. Thereafter, the polystyrene film so irradiated was coated with a sub-coating solution having the following composition, and dried for 2 minutes at 90° C.

| | |
|---|---|
| Maleic anhydride-vinyl acetate copolymer (1:1) | g-- 25 |
| Methanol | cc-- 500 |
| Acetone | cc-- 250 |
| n-Butanol | cc-- 50 |
| Chromic acetate | g-- 2.5 |

The sub-coated support surface was not cracked by the solvent, and the results of the adhesion test during processing and in the dry state were very good.

On the other hand, a photo-sensitive material prepared by coating a similar support with a sub-coating solution having the same composition but omitting the irradiation step, exhibited insufficient adhesion between the emulsion layer and the support both during processing and in the dry state. Moreover, numerous fine cracks were observed on the surface of the support when it was coated with a sub-coating solution in which the content of acetone in the foregoing composition had been increased to 500 cc. to give an acetone-methanol ratio of 1:1 for the purpose of improving the adhesive strength.

EXAMPLE 5

The sub-coating solution of Example 4 was replaced by one of the following compositions, but otherwise the same procedure was followed.

| | |
|---|---|
| Polyvinyl pyrrolidone | g-- 60 |
| Polyacrylic acid | g-- 40 |
| Aqueous ammonia (30%) | cc-- 2 |
| Methanol | cc-- 1500 |
| Ethyl acetate | cc-- 300 |

The sub-coated support produced was coated with a gelatin silver halide emulsion to prepare a photographic film, which exhibited good transparency and very good adhesion between the emulsion layer and the support.

EXAMPLE 6

A sub-coating solution having the following composition was applied to both surfaces of a foamed polystyrene sheet, having a thickness of $200\mu$ and an apparent specific gravity of 0.15; the undried sub-coated sheet was irradiated under the same conditions as in Example 1 and then dried for 2 minutes at 80° C.

| | |
|---|---|
| Gelatin | g-- 25 |
| Water | cc-- 300 |
| Methanol | cc-- 700 |
| Toluene | cc-- 125 |
| Salicylic acid | g-- 6 |
| Formalin | cc-- 0.5 |

A photo-sensitive material, produced by applying a gelatino-silver halide emulsion to one side of the support so obtained and a gelatin backing layer to the other side thereof exhibited good adhesion to the support of both the emulsion layer and the backing layer.

What is claimed is:
1. A photo-sensitive material consisting essentially of:
   (a) an ultra-violet irradiated polystyrene support having coated thereon, successively, a sub-coating consisting essentially of a solvent or plasticizer for said polystyrene and a resin adherent to a photographic emulsion, and
   (b) a gelatin-silver halide photographic emulsion layer, said material prepared by;
      (1) applying a sub-coating solution to a surface of a polystyrene support to form a sub-coating layer thereon, said sub-coating solution consisting essentially of a solvent or plasticizer for said polystyrene and a resin adherent to said gelatin-silver halide photographic emulsion, and irradiating said support surface with ultra-violet radiation, and
      (2) subsequently, applying a gelatin-silver halide photographic emulsion layer to the resulting prepared support surface.
2. A photo-sensitive material consisting essentially of:
   (a) an ultra-violet irradiated polystyrene support having coated thereon, successively, a sub-coating consisting essentially of a solvent or plasticizer for said polystyrene and a resin adherent to a gelatin-silver halide photographic emulsion, and
   (b) a gelatin-silver halide photographic emulsion layer.

3. The photo-sensitive material of claim 2, wherein said resin is gelatin, casein, or a synthetic polymer containing groups selected from the group consisting of —OH, —COOH,

and —SO$_3$M, wherein M is a member selected from the group consisting of a hydrogen atom and an alkali metal.

4. The photo-sensitive material of claim 3, wherein said synthetic polymer is a member selected from the group consisting of cellulose acetate maleate, a vinyl-maleic anhydride copolymer, an acrylamide-methacrylic acid copolymer, and a mixture of polyvinyl pyrrolidone and polyacrylic acid.

5. The photo-sensitive material of claim 2 wherein said solvent is a member selected from the group consisting of water, an alcohol, a phenol, a carboxylic acid ester, a chlorinated paraffin, an aromatic hydrocarbon, and a mixture thereof.

References Cited
UNITED STATES PATENTS 3,475,193  10/1969  Takenaka et al. ____ 117—47 A
3,010,838  11/1961  Uber _____ 96—87 R RONALD H. SMITH, Primary Examiner U.S. Cl. X.R.
117—34, 47 A